(12) United States Patent
Buti

(10) Patent No.: US 6,421,758 B1
(45) Date of Patent: Jul. 16, 2002

(54) METHOD AND SYSTEM FOR SUPER-FAST UPDATING AND READING OF CONTENT ADDRESSABLE MEMORY WITH A BYPASS CIRCUIT

(75) Inventor: Taqi Nasser Buti, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,831

(22) Filed: Jul. 26, 1999

(51) Int. Cl.[7] ............................................. G06F 12/00

(52) U.S. Cl. ......................... 711/108; 365/49; 712/217

(58) Field of Search ........................... 365/49; 711/108; 712/217

(56) References Cited

U.S. PATENT DOCUMENTS

| | | | |
|---|---|---|---|
| 5,355,457 A | 10/1994 | Shebanow et al. | 712/218 |
| 5,740,414 A | 4/1998 | Tovey et al. | 712/233 |
| 5,745,780 A | 4/1998 | Phillips et al. | 712/23 |
| 5,841,999 A | 11/1998 | Le et al. | 712/217 |
| 6,137,707 A * | 10/2000 | Srinivasan et al. | 365/49 |
| 6,215,685 B1 * | 4/2001 | Fung et al. | 365/49 |

OTHER PUBLICATIONS

U.S. Patent Application No. 08/507,542, Filed Jul. 26, 1995, Chiao–Mei Chuang, et al.
U.S. Patent Application No. 09/134,339, Filed Aug. 14, 1998, Christopher McCall Durham, et al.
IBM Technical Disclosure Bulletin, "Dynamic Content Addressable Memory with Refresh Feature", vol. 26, No. 10B, Mar. 1984, S.E. Schuster P5364–5366.

* cited by examiner

Primary Examiner—Kenneth S. Kim
(74) Attorney, Agent, or Firm—Anthony V. S. England; Bracewell & Patterson, L.L.P.

(57) ABSTRACT

The method and system provided may be utilized to efficiently perform register mapping in a superscalar processor, wherein a content addressable memory array stores mapping data which indicates the relationship between logical registers and physical registers and wherein compare circuitry compares the mapping data with a logical register identifier to provide the related physical register. The content addressable memory is updated with new mapping data while concurrently driving the new mapping data along a bus to compare circuitry. The new mapping data is compared with a logical register identifier in the compare circuitry, such that for instruction dispatch cycles which require updating and reading the content addressable memory, the new mapping data is dynamically written through to the compare circuitry during the update of the content addressable memory.

15 Claims, 4 Drawing Sheets

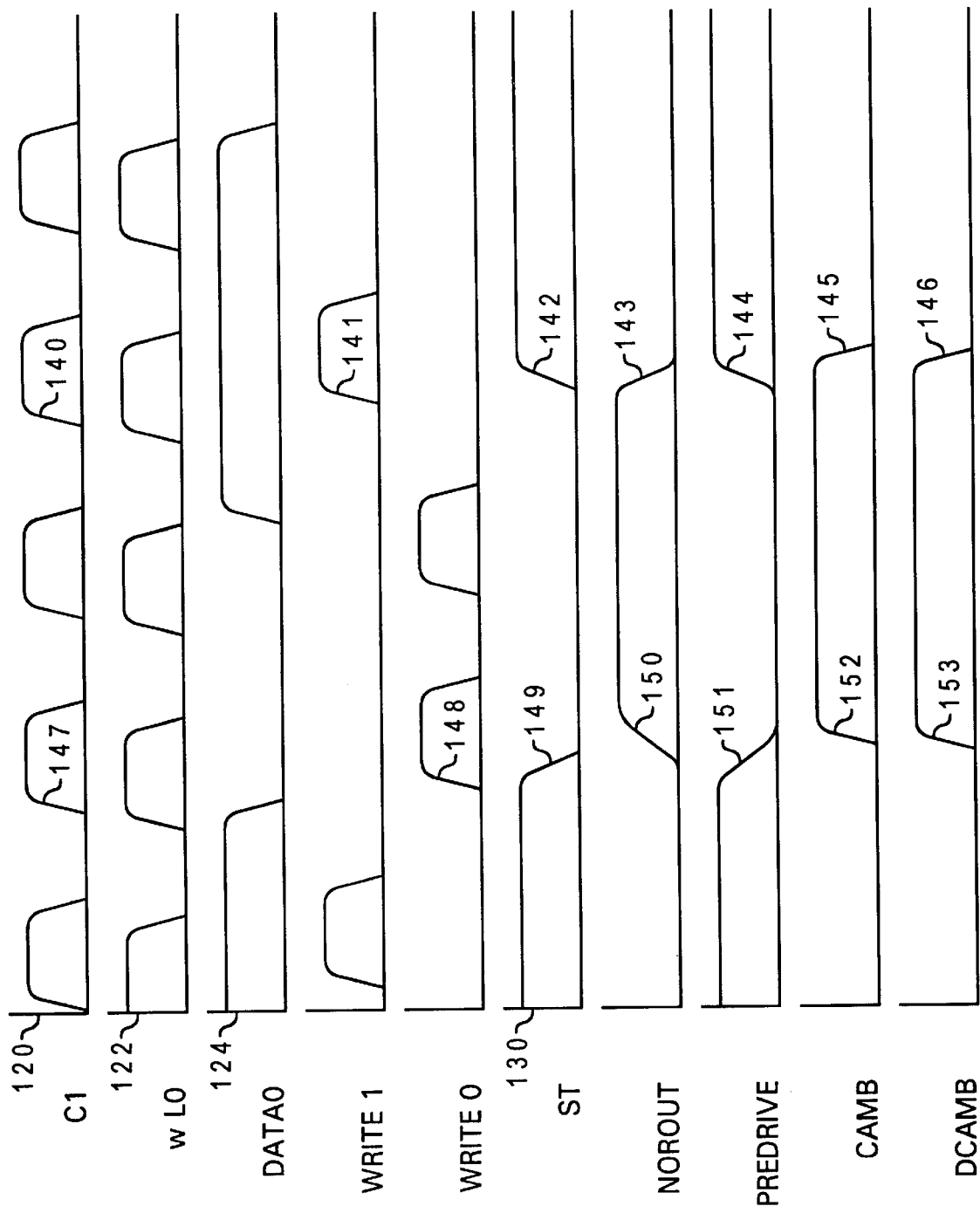

METHOD AND SYSTEM FOR SUPER-FAST UPDATING AND READING OF CONTENT ADDRESSABLE MEMORY WITH A BYPASS CIRCUIT

BACKGROUND OF THE INVENTION

1. Technical Field

The present invention relates in general to an improved data processing system, and in particular to an improved method and system for super-fast updating and reading of content addressable memory. More particularly, the present invention relates to an improved method and system for updating and reading content addressable memory with a bypass circuit for providing a fast update and read path.

2. Description of the Related Art

In a typical microprocessor, instructions are executed in a serial fashion. That is, a stream of instructions is executed by the microprocessor in the order in which the instructions are received. While this method of execution is effective, in many cases this method is not optimal because often many instruction sequences in a computer program are independent of other instruction sequences. Therefore, independent instructions may be executed in parallel to optimize performance. It is this concept of executing instructions in parallel, out-of-order, which underlies the executing methods of superscalar processors.

To provide for out-of-order execution, superscalar processors typically utilize more physical registers than available logical registers. Logical registers are registers which are referenced in the instructions. Physical registers are the registers within the processor which are actually used for storing data during processing. The extra physical registers are needed in superscalar processors in order to accommodate out-of-order, parallel processing. One consequence of having more physical registers than logical registers is that there is not one-to-one correspondence between the logical and physical registers. Rather, a physical register may correspond to a first logical register for one set of instructions and then correspond to second logical register for another set of instructions. Because the relationship between logical and physical registers can change, a mapping or coordination function is performed in order to keep track of the changing relationships.

This mapping may be performed utilizing a register map to locate the physical registers that hold the latest results for each logical register. In particular, a content addressable memory (CAM) array may be utilized as the register mapping tool in conjunction with other logic devices. The CAM array stores mapping data in CAM latches. The mapping data indicates, for each logical register, the respective physical register mapped thereto. When a logical register identifier is input to the CAM for an instruction, the mapping data from the latches is compared to the logical register identifier by compare circuitry. If a match occurs, the CAM asserts a match line indicating which physical register corresponds to the identified logical register. When a physical register is reassigned from one logical register to another, the mapping data in the CAM latches must be updated such that correct comparisons may continue.

As the number of instructions executed in parallel increases, the number of logical registers utilized and therefore the number of physical registers needed, increases. Further, the memory space required to implement a CAM array to map the logical and physical registers and make comparisons increases. Therefore, as processors increase in performance and capacity, an efficient method and system for performing register mapping, and in particular CAM accesses/updates during register mapping, is needed.

SUMMARY OF THE INVENTION

It is therefore one object of the present invention to provide an improved data processing system.

It is another object of the present invention to provide an improved method and system for super-fast updating and reading of content addressable memory.

It is yet another object of the present invention to provide an improved method and system for updating and reading content addressable memory with a bypass circuit for providing a fast update and read path.

The foregoing objects are achieved as is now described. The method and system provided may be utilized to efficiently perform register mapping in a superscalar processor, wherein a content addressable memory array stores mapping data which indicates the relationship between selected logical registers and associated physical registers and wherein compare circuitry compares the mapping data with a logical register identifier to identify the related physical register. The content addressable memory is updated with new mapping data while concurrently driving the new mapping data along a bus to compare circuitry. The new mapping data is compared with a logical register identifier in the compare circuitry, such that for instruction dispatch cycles which require updating and reading the content addressable memory, the new mapping data is dynamically written through to the compare circuitry during the update of the content addressable memory.

BRIEF DESCRIPTION OF THE DRAWINGS

The novel features believed characteristic of the invention are set forth in the appended claims. The invention itself however, as well as a preferred best mode of use, further objects and advantages thereof, will best be understood by reference to the following detailed description of an illustrative embodiment when read in conjunction with the accompanying drawings, wherein:

FIG. 4 illustrates a timing diagram illustrating a CAM update and read according to the method and system of the present invention.

DETAILED DESCRIPTION OF THE PREFERRED EMBODIMENT

Figure 1:
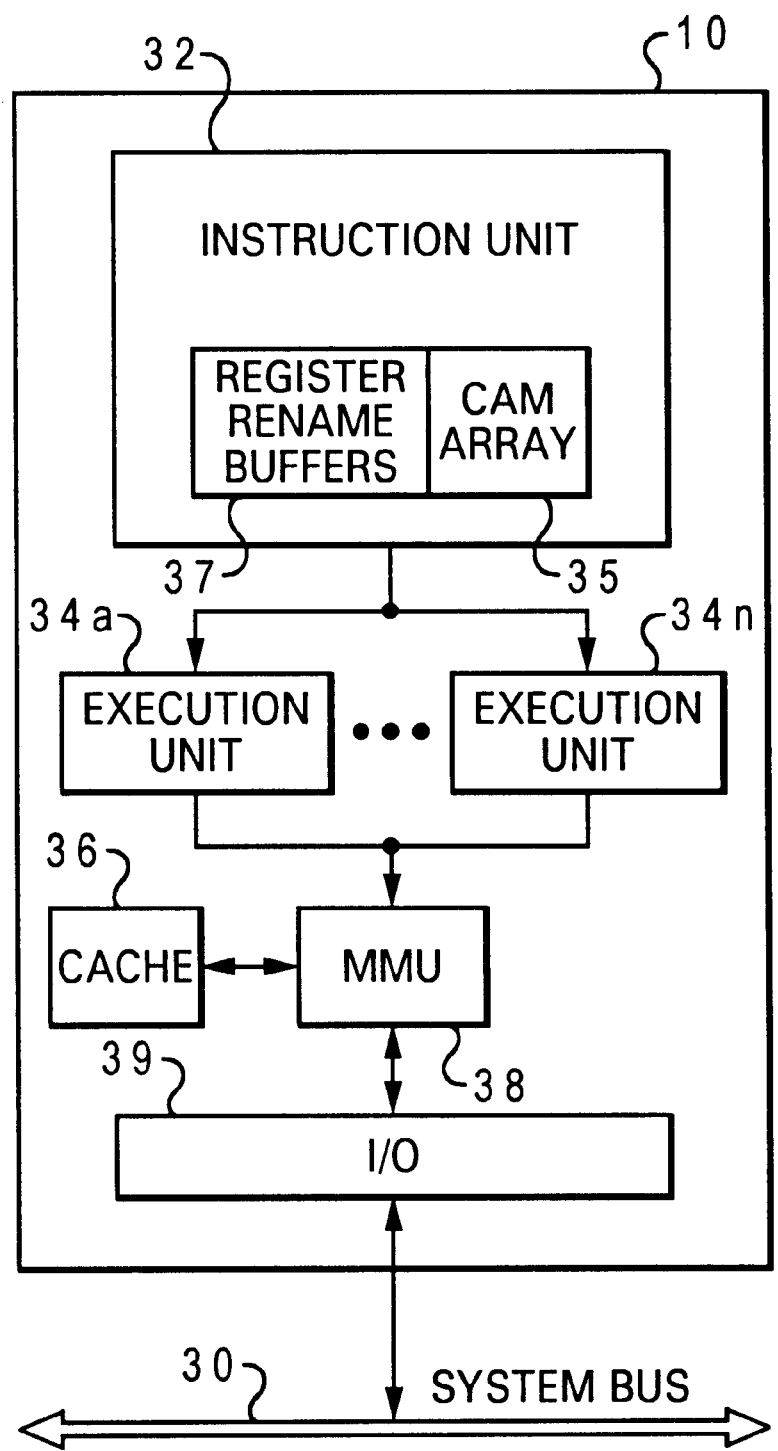
FIG. 1 depicts a superscalar data processing system in accordance with the method and system of the present invention.

As illustrated in FIG. 1, there is depicted a superscalar data processor in accordance with the method and system of the present invention. Note that processor 10 is illustrated as a conceptual block diagram intended to show the basic features rather than an attempt to show how these features are physically implemented on a chip. In particular, processor 10 preferably includes multiple functional units which are specified for providing data processing functions which are well known in the art such as fetching, decoding, executing instructions and transferring data to and from other resources over a system bus 30. While one embodiment of a processor architecture with typical functional units is depicted, additional processor architectures may also be utilized as will be apparent to one skilled in the art.

In particular, for processor 10 depicted, data is fetched from system bus 30, through an I/O controller 39, memory management unit (MMU) 38 and cache 36, into an instruction fetching unit within instruction unit 32. Instruction unit 32 decodes each instruction into different control bits, which in general designate: i) a type of functional unit for performing the operation specified by the instruction; ii) source operands for the instruction; and iii) destinations for results of operations. In providing a destination for results of the instruction operation, multiple register rename buffers 37 are provided within instruction unit 32 to which the destination results may be assigned utilizing register renaming with a CAM array 35, as will be further described. In addition, instruction unit 32 sequences the decoded instructions and passes the decoded instructions to the appropriate execution unit of execution units (EXUs) 34a–34n. Preferably, each of execution units 34a–34n is specified to execute particular types of instructions such as branch instructions, floating point instructions, fixed point instruction and load/store instructions.

Typically, processor instructions are decoded within instruction unit 32 to reference logical registers, as previously described in the background of the invention. These logical registers may be source registers which contain certain data needed to execute the instruction, or these registers may be destination registers to which data resulting from the execution of the instruction is to be written. Therefore, logical registers are nothing more than logical values. Logical registers do not point to any physical location at which a physical register resides. To get from a logical register value to a physical register, a translation or mapping process is carried out. This mapping function is one of the functions performed by instruction unit 32, utilizing register rename buffers 37 and CAM array 35. Since there is typically not a one-to-one correspondence between logical and physical registers, the relationships between the registers are constantly changing. Hence, the register rename buffers 37 need to be able to handle the changing relationships. CAM array 35 is provided with register rename buffers 37 in order to provide mapping between the physical registers and logical registers. In particular, physical registers, comprised of register rename buffers 37, within instruction unit 32, may be mapped to by CAM array 35.

Figure 2:
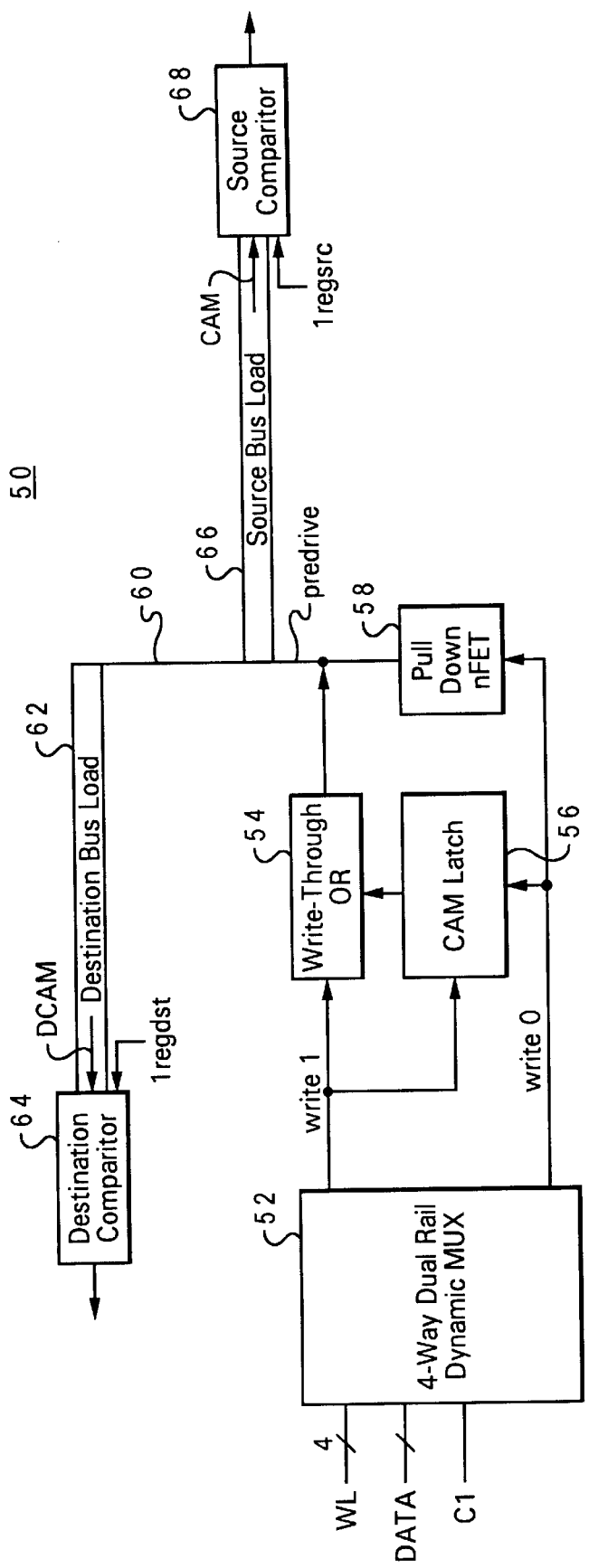
FIG. 2 illustrates a high level block diagram of a write-through dynamic CAM according to the method and system of the present invention.

With reference now to FIG. 2, there is depicted a high level block diagram of a single bit write-through dynamic CAM according to the method and system of the present invention. When multiple instructions are executed in parallel, the number of physical registers required to perform the instructions may increase. As previously described, as the number of required physical registers increases, the size of the CAM array increases. However, typically it is preferable to effectively reduce the size of the CAM array by achieving an area efficient floor plan which meets required cycle times. In the present invention, this reduction in size and area efficient floor plan are achieved in that the mapping data from the CAM latches is driven substantial distances to source and destination arrays to be compared in compare circuitry with the logical register identifiers. In these applications, the core of the CAM array may only contain the CAM data latches and CAM update MUXes for holding data until the data is updated in the CAM latches.

In the present invention, the write-through dynamic CAM 50 includes in its core: a dynamic MUX 52, a CAM latch 56, and hardware efficient by-pass circuitry including write-through OR 54 and pull-down nFET 58. The by-pass circuitry controls the initial update of data to a CAM driver bus 60 as a predrive signal. In particular to the present invention, multiple comparators including destination comparator 64 and source comparator 68, are placed a substantial distance from CAM latch 56, along CAM driver bus 60, to utilize the chip area most efficiently. In particular, the data passed to CAM driver bus 60 is passed to a destination comparator 64 as a dcam signal through a destination bus load 62 and passed to a source comparator 68 as a cam signal through a source bus load 66. Further, the destination logical register identifier and source logical register identifier to which the CAM latch data is to be compared is also driven to destination comparator 64 as lregdst and input to source comparator 68 as lregsrc. If the data matches, a match line may be asserted by the comparitor. In addition, as will be further depicted in FIG. 4, the dcam signal and cam signal are locally inverted (not shown) at destination comparator 64 and source comparator 68 to a dcamb and camb signal respectively. Thereby, the speed at which the dcam and cam signals are driven from CAM driver bus 60 to destination comparator 64 and source comparator 68 may be measured during simulation by the dcamb and camb signals.

Figure 3:
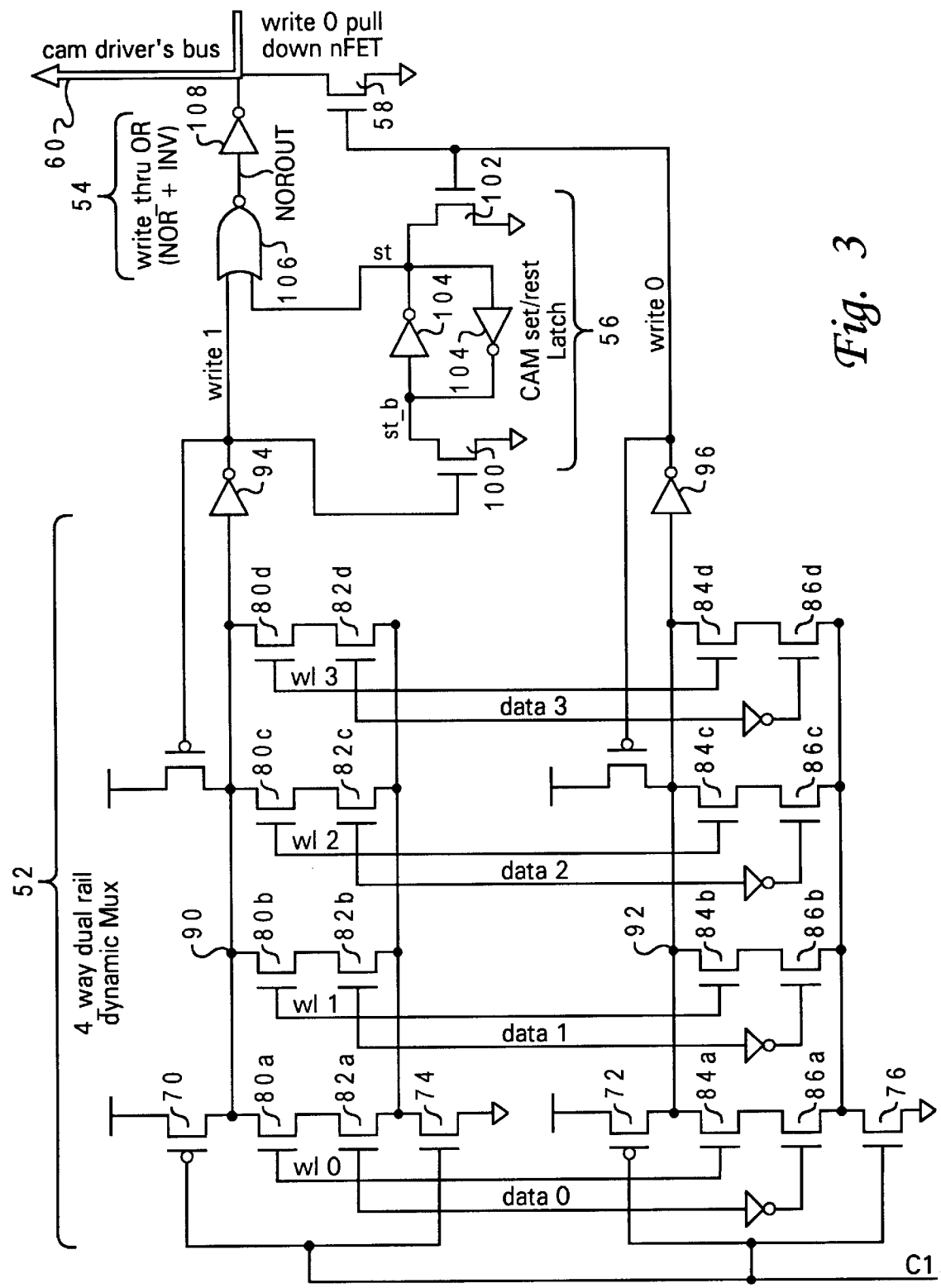
FIG. 3 depicts a portion of a circuit diagram of a write-through dynamic CAM according to the method and system of the present invention.

With reference now to FIG. 3, there is illustrated a portion of a circuit diagram of a write-through dynamic CAM according to the method and system of the present invention. As depicted, 4-way dual rail dynamic MUX 52 includes multiple FETs and inverters in order to control the signal level of write 0 and write 1 signals. In describing signal levels of the write 0 and write 1 signals, in addition to other signals described hereafter, a "0" or low signal may be described interchangeably and a "1" or high signal may be described interchangeably to indicate the current/voltage levels output along the circuit. Also, in particular, the number of ways of the dual rail dynamic MUX is preferably the number of instructions dispatched in one cycle. Thereby, in alternate embodiments of the present invention, the dual rail dynamic MUX may be any multiple of ways which corresponds to the number of instructions dispatched in one cycle.

A C1 signal is preferably controlled by a clock whereby when clock pulse C1 is high, FETs 74 and 76 are on and when clock pulse C1 is low, FETs 70 and 72 are on. Thereby, when C1 is low, dynamic MUX 52 is in a precharge phase and when C1 is high, dynamic MUX 52 is in an evaluation phase. In particular, when C1 is low, FETs 70 and 72 are on, both points 90 and 92 are precharged high, however both are inverted by inverters 94 and 96, respectively, to result in a precharged low write 0 signal and low write 1 signal. While particular points 90 and 92 are distinguished, it will be understood by someone well known in the art that any points along the path including points 90 and 92 will also be precharged high.

When either of FETs 74 and 76 are on, dynamic MUX 52 evaluates other data inputs to output a high write 0 or high write 1 signal. If a write enable signal(wl0, wl1, wl2 or wl3) is high, the corresponding FETs or FETs 80a–80d and 84a–84d are on. If a data signal (data0, data1, data2 or data3) is high, the corresponding FETs 82a–82d are on. Further, if the data signal (data0, data1, data2 or data3) is low, the corresponding FETs 86a–86d are on.

More specifically, when FET 74 is on and both FET 80a and FET 82a are on, a low signal is evaluated at point 90 which is inverted to a high write 1 signal. Similarly, when FET 74 is on and when FET 80b and FET 82b are on, FET 80c and FET 82c are on, or FET 80d and FET 82d are on, a low signal is evaluated at point 90 which is inverted to a high write 1 signal. Alternatively when FET 76 is on and both FET 84a and FET 86a are on, a low signal is evaluated at point 92 which is inverted to a high write 0 signal. Similarly, when FET 76 is on and when FET 84b and FET 86b are on, FET 84c and FET 86c are on, or FET 84d and FET 86d are on, a low signal is evaluated at point 92 which is inverted to a high write 0 signal.

The write 1 signal and write 0 signal serve multiple functions in the present invention. In a first function, the write 1 signal and write 0 signal drive set/reset static CAM latch 56 to capture the input data passed by dynamic MUX 52. When the write 1 signal is high, FET 100 is on which sets a "1" in CAM latch 56 at the point "st". Alternatively, when the write 0 signal is high, FET 102 is on which resets a "0" in CAM latch 56 at point st. By inverter feedback loop 104, the state of latch remains static until set or reset. As will be further described, CAM latch 56 provides a static storage area for holding a current data value which is provided to CAM driver bus 60 through write-through OR 54 during the changing C1 clock cycles.

In addition, the write 1 signal and write 0 signal serve as detection signals for early propagation of a "1" or "0" on the CAM driver bus. In particular, the combination of write-through OR 54 and pull-down nFET 58 allows fast path control of data propagating along CAM driver bus 60. Write-through OR 54 includes a 2-input nor gate 106 which receives inputs from the write 1 signal and from the point st of CAM latch 56. The output of nor gate 106 is inverted by inverter 108 before being placed on CAM driver bus 60. Thereby, when the write 1 signal is high, a fast path to CAM bus driver 60 for setting a "1" on CAM driver bus 60 is provided.

Thereafter, when CAM latch 56 is set to "1", the st signal will hold the data output from write-through OR 54 at "1". When neither the write 1 signal or the point st are high, a "0" is output to CAM driver bus 60. For fast propagation of a "0", pull down nFET 58 is on when the write 0 signal is high. When pull down nFET 58 is on, CAM driver bus 60 is connected to ground, thus placing a "0" on CAM bus driver 60. As will be further depicted, write-through OR 54 and pull down nFET 58 allow fast and early propagation of data to CAM bus driver 60 along a faster path than the data path to CAM latch 56. As depicted, bypassing CAM latch 56 with write-through OR 54 is achieved with a simple gate which is hardware efficient. In particular, this "critical gating" allows the transition to static propagation of inputs on CAM driver bus 60 during cam update and read.

Essentially, the propagation of data through dynamic CAM 50 when updating occurs can be divided into two phases. In the first phase, either the write 1 signal or write 0 signal is evaluated to high. In the case of the write 1 signal evaluated to high, a "1" is propagated onto CAM driver bus 60 through write-through OR 54. In parallel and at the same time, CAM latch 56 is set to "1" and is utilized to hold the bus signal at "1" by the st signal of CAM latch 56 through write-through OR 54. In the case of the write 0 signal evaluated to high, a "0" is propagated onto CAM driver bus 60 through pull-down nFET 58. In addition, CAM latch 56 is set to "0" and a "0" is held as the output of write-through OR 54 from the st signal of CAM latch 56. In a second phase, the data has propagated to the comparitors within the set-up time requirements thereof, as will be further described.

When there is not a CAM update during an evaluation cycle, the write 0 and write 1 signals remain in the precharged state. In addition, write-through OR 54 acts as a buffer to allow the state of CAM latch 56 to be kept on CAM driver bus 60 and thereby available at the comparitors.

With reference now to FIG. 4, there is depicted a timing diagram illustrating a CAM update according to the method and system of the present invention. In particular, the timing diagram illustrates differences in fast paths for propagating a "0" and a "1" to the CAM driver bus within a particular delta time. As previously described, clock signal C1, write word enables (wl0, wl1, wl2 and wl3), and data (data0, data1, data2 and data3) are input to the dual rail dynamic MUX. As depicted at reference numeral 120, a clock signal C1 is a periodic pulse. A wl0 signal is illustrated at reference numeral 122 as a periodic pulse. Further, a data0 signal is depicted at reference numeral 124.

At the time when the timing diagram starts, the wl0 signal and data0 signal are high. In particular, when the wl0 signal and data0 signal are high, all other write word enable and data signals are low. Thereby, the signal st, depicted at reference numeral 130, has been set high, indicating that a "1" is latched in the CAM latch. However, before the next pulse of C1 which is depicted at reference numeral 147, the data0 signal shifts low. After the clock pulse depicted at reference numeral 147, since wl1 is still high but data0 is low, the write 0 signal shifts high as depicted at reference numeral 148. In particular, the fastest path to propagate a "0" to the CAM driver bus is through the pull down nFET. As depicted at reference numeral 151, the predrive signal which is controlled by the pull down nFET falls to "0" quickly after the write 0 signal shifts high. In the example depicted, the delay from the rising edge of the write 0 signal to the falling edge of the predrive signal is 67 picoseconds.

In addition, when the write 0 signal rises, the CAM latch is reset. As depicted at reference numeral 149, the st signal falls to "0" after the rising of the write 0 signal. In the example depicted, the delay from the rising edge of the write 0 signal to the falling edge of the st signal is 57 picoseconds. After the st signal is reset to "0", the write-through OR output is altered. The norout signal depicts the signal output from the nor gate within the write-through OR. As depicted at reference numeral 150, the norout signal rises after the st signal is reset. In the example depicted, the delay from the falling edge of the st signal to the rising edge of the norout signal is 127 picoseconds. Therefore, while a "0" is pushed on the CAM driver bus only 67 picoseconds after the rising edge of the write 0 signal through the pull down nFET, there is a delay of at least 184 picoseconds before the "0" is output to the CAM driver bus from the write-through OR, and held constant by the value in the static CAM latch. For example, as depicted, the write 0 signal rises and falls twice while the st signal remains low, thus maintaining a low signal along the CAM driver bus. This indicates early propagation of "0" on the CAM driver bus.

The write-through OR path provides the fastest path for propagating a "1" on the CAM driver bus. As depicted at reference numeral 141, at the C1 pulsed depicted at reference numeral 140, the write 1 signal rises due to the state of data0 and wl0 as high. The write 1 signal is directly sent to the write-through OR gate as a "1". As depicted at reference numeral 143, the norout signal falls quickly after the rising edge of the write 1 signal. In the example illustrated, the delay between the rising edge of the write 1 signal and the falling edge of the norout signal is 41 picoseconds. The predrive signal which is the actual signal output on the CAM driver bus is set to "1" from the output of the write-through OR after a delay of 103 picoseconds from the rising edge of the write 1 signal. In addition, the CAM latch is set to "1" when write 1 is high. As depicted at reference numeral 142, the st signal rises after a delay of 112 picoseconds. Therefore, while a "1" is pushed on the CAM driver bus only 103 picoseconds after the rising edge of the write 1 signal through the write-through OR, there is a delay of 112 picoseconds before the "0" is even latched into the CAM latch to set the St signal to "1". This again indicates early propagation of new data on the CAM driver bus before the new data is latched by the CAM array.

As depicted in FIG. 2, the camb signal is the data signal which reaches the source comparitor from the CAM driver bus. The dcamb signal is the data signal which reaches the destination comparitor from the CAM driver bus. As depicted, the "0" which is propagated along the CAM driver bus during the second period of C1, is available during the second period of C1 as a high camb signal as depicted at reference numeral 152 and is available as a high dcamb signal as depicted at reference numeral 153. Further, the "1" which is propagated along the CAM driver bus during the fourth period of C1 is available as a low camb signal as depicted at reference numeral 145 and is available as a low dcamb signal as depicted at reference numeral 146.

In the particular design example, the comparitor circuits require that data is received less than 350 picoseconds from the enabling clock 120 in order to meet set-up times for the comparitors. In particular, when the comparitors are located at a distance from the CAM latches, the driving time for the data must be taken into account. In the present invention, the critical data propagation path is optimized to obtain the fastest arrival time at the comparitors for both a "0" and a "1". Of particular interest in the data propagation path is the time taken from when the C1 pulse rises as depicted at reference numeral 147 until the camb and dcamb signal rise as depicted at reference numerals 152 and 153 respectively. As illustrated, the delta time between reference numeral 147 and reference numeral 152 is 348 picoseconds which meets the set-up time requirement for the source comparitor. As depicted, the delta time between reference numeral 147 and reference numeral 153 is 321 picoseconds which also meets the set-up time requirement for the destination comparitor. By placing data on the CAM driver bus through a fast bypass path of the write-through OR and pull-down nFET, the data is placed on the bus early enough to set the camb and dcamb signals within the required set-up time.

While the invention has been particularly shown and described with reference to a preferred embodiment, it will be understood by those skilled in the art that various changes in form and detail may be made therein without departing from the spirit and scope of the invention. For example, while an application of the CAM array has been shown as a mapping function of a rename buffer within a processor, any other application of a CAM array may be utilized where the data stored therein may values other than those mapping logical and physical registers which are described. In particular, other applications of a CAM array where it is preferable to place comparitor logic at a distance from the CAM latches is within the spirit and scope of the present invention.

What is claimed is:

1. A method of efficiently performing register mapping in a superscalar processor, wherein a write-through content addressable memory array stores mapping data which indicates the relationship between logical registers and physical registers, wherein compare circuitry, separate from said write-through content addressable memory, compares said mapping data with a logical register identifier to provide the related physical register, said method comprising the steps of:

updating said write-through content addressable memory with new mapping data while concurrently driving said new mapping data utilizing a hardware efficient by-pass circuit along a bus to said compare circuitry; and comparing said new mapping data with a logical register identifier in said compare circuitry, such that for instruction dispatch cycles which require updating and reading said write-through content addressable memory, said new mapping data is dynamically written through to said compare circuitry during said update of said content addressable memory.

2. The method of efficiently performing register mapping in a superscalar processor according to claim 1, said step of updating said write-through content addressable memory with new mapping data while concurrently driving said new mapping data along a bus to said compare circuitry further comprising the steps of:

passing said new mapping data through a write-through OR circuit to said bus immediately prior to updating said write-through content addressable memory, in response to new mapping data which represents a logic one;

driving a logic zero on said bus by grounding said bus by enabling a pull-down nFET prior to updating said write-through content addressable memory, in response to new mapping data which represents a logic zero;

updating said write-through content addressable memory by setting a static latch with said new mapping data; and passing said new mapping data set in said static latch to said bus through said write-through OR circuit to maintain the value of said new mapping data on said bus until another update to said write-through content addressable memory occurs.

3. The method of efficiently performing register mapping in a superscalar processor according to claim 1, said method further comprising the step of:

providing said new mapping data from a dual-rail dynamic multiplexer which outputs new mapping data which represents a logic one from a first rail and which outputs new mapping data which represents a logic zero from a second rail.

4. A system for efficiently performing register mapping in a superscalar processor, said system comprising:

a write-through content addressable memory array for storing mapping data which indicates relationships between logical registers and physical registers;

compare circuitry for comparing said mapping data with a logical register identifier to provide a related physical register;

means for updating said write-through content addressable memory with new mapping data while concurrently driving said new mapping data along a bus to compare circuitry; and means for comparing said new mapping data with a logical register identifier in said compare circuitry, such that for instruction dispatch cycles which require updating and reading said write-through content addressable memory, said new mapping data is dynamically written through to said compare circuitry during said update of said write-through content addressable memory.

5. The system for efficiently performing register mapping in a superscalar processor according to claim 4, said means for updating said write-through content addressable memory with new mapping data while concurrently driving said new mapping data along a bus to compare circuitry further comprising the steps of:

means for passing said new mapping data through a write-through OR circuit to said bus immediately prior to updating said write-through content addressable memory, in response to new mapping data which represents a logic one;

means for driving a logic zero on said bus by grounding said bus by enabling a pull-down nFET prior to updating said write-through content addressable memory, in response to new mapping data which represents a logic zero;

means for updating said write-through content addressable memory by setting a static latch with said new mapping data; and means for passing said new mapping data set in said static latch to said bus through said write-through OR circuit to maintain the value of said new mapping data on said bus until another update to said write-through content addressable memory occurs.

6. The system for efficiently performing register mapping in a superscalar processor according to claim 4, said system further comprising:

means for providing said new mapping data from a dual-rail dynamic multiplexer which outputs new mapping data which represents a logic one from a first rail and which outputs new mapping data which represents a logic zero from a second rail.

7. A write-through content addressable memory, comprising:

a plurality of latches for storing mapping data, where said mapping data indicates relationships between a plurality of logical registers and a plurality of physical registers;

a dynamic multiplexer for holding new mapping data before said new mapping data updates said mapping data in said plurality of latches;

a write-through circuit, including a hardware efficient by-pass circuit, interposed between said dynamic multiplexer and a bus to compare circuitry; and means for updating said plurality of latches with said new mapping data while concurrently passing said new mapping data through said write-through circuit and driving said new mapping data along said bus to said compare circuitry, such that for register mapping which requires updating of said write-through content addressable memory, said new mapping data is dynamically written through to said compare circuitry during said update of said write-through content addressable memory.

8. The write-through content addressable memory according to claim 7, wherein said hardware efficient by-pass circuit includes a pull-down nFET coupled to said bus for grounding said bus when said new mapping data represents a logic zero.

9. A fast write-through content addressable memory, comprising:

a latch for storing data;

a dual-rail dynamic multiplexer with a first output signal and a second output signal for controlling the updating of data in said latch;

a write-through OR circuit with inputs from said first output signal and said latch, for passing said data to a bus for driving said data to a plurality of comparators, wherein said write-through OR circuit passes said first output signal to said bus prior to the updating of data in said latch by said first output signal; and a pull-down FET connected to said bus and controlled by a second output signal, wherein when said second output signal is high, said pull-down FET is connected to ground, wherein said pull-down FET grounds said bus prior to the updating of data in said latch by said second output signal.

10. The fast write-through content addressable memory according to claim 9, further comprising:

means for setting said latch to a high signal when said first output signal is output high from said dual-rail dynamic multiplexer; and means for setting said latch to a low signal when said second output signal is output high from said dual-rail dynamic multiplexer.

11. The fast write-through content addressable memory according to claim 9, said write-through OR further comprising:

a nor gate with inputs from said latch and said first output signal; and an inverter coupled between said nor gate and said bus.

12. The fast write-through content addressable memory according to claim 9, further comprising:

a comparator for comparing a signal on said bus with a comparison signal whereby if said signal on said bus is equivalent to said comparison signal a match is indicated.

13. The fast write-through content addressable memory according to claim 12, whereby said comparator is positioned apart from said latch and connected by said bus, wherein said write-through OR and said pull-down FET comprise a hardware efficient write-through mechanism from said latch to said bus.

14. The fast write-through content addressable memory according to claim 9, wherein said first output signal is utilized as a detection signal to set said latch to a high signal and to propagate a high signal on said bus.

15. The fast write-through content addressable memory according to claim 9, wherein said second output signal is utilized as a detection signal to set said latch to a low signal and to propagate a low signal on said bus.

* * * * *